(12) United States Patent
Mahy

(10) Patent No.: US 11,760,124 B2
(45) Date of Patent: Sep. 19, 2023

(54) METHOD OF COLOR CORRECT MANUFACTURING DECORATIVE PANELS

(71) Applicant: AGFA NV, Mortsel (BE)

(72) Inventor: Marc Mahy, Mortsel (BE)

(73) Assignee: AGFA NV, Mortsel (BE)

( * ) Notice: Subject to any disclaimer, the term of this patent is extended or adjusted under 35 U.S.C. 154(b) by 326 days.

(21) Appl. No.: 17/284,704

(22) PCT Filed: Oct. 16, 2019

(86) PCT No.: PCT/EP2019/078063
§ 371 (c)(1),
(2) Date: Apr. 12, 2021

(87) PCT Pub. No.: WO2020/079067
PCT Pub. Date: Apr. 23, 2020

(65) Prior Publication Data
US 2021/0354502 A1    Nov. 18, 2021

(30) Foreign Application Priority Data

Oct. 16, 2019 (EP) ..................................... 18200919

(51) Int. Cl.
*B32B 3/10* (2006.01)
*B44C 5/04* (2006.01)
(Continued)

(52) U.S. Cl.
CPC .......... *B44C 5/04* (2013.01); *G06F 18/23213* (2023.01); *G06T 7/0004* (2013.01); *G06T 7/90* (2017.01); *G06T 2207/10024* (2013.01)

(58) Field of Classification Search
None
See application file for complete search history.

(56) References Cited

U.S. PATENT DOCUMENTS

2015/0097907 A1    4/2015   Kalwa et al.

FOREIGN PATENT DOCUMENTS

EP          0 611 231 A1      8/1994
EP          2894044 A1 *      7/2015  ................ B41J 2/01
(Continued)

OTHER PUBLICATIONS

International Search Report dated Jan. 7, 2020 relating to PCT/EP2019/078063, 3 pages.
(Continued)

*Primary Examiner* — Christopher M Polley
(74) *Attorney, Agent, or Firm* — Leydig, Voit & Mayer, Ltd.

(57) ABSTRACT

Method of manufacturing decorative panels comprising the steps: inkjet printing on a substrate an oligochromatic pattern by an inkjet printing system to form a decorative layer (250); impregnating by a resin impregnator (320) the decorative layer with a thermosetting resin; heat pressing (500) by a heating press (550) the impregnated decorative layer (41) together with a core layer (410) for forming a decorative panel (650); wherein the method comprises an extra step of identifying, by using a color control unit (250), a color acceptance of the decorative panel between the step of forming the decorative layer (200) and the step of impregnating the decorative layer.

15 Claims, 3 Drawing Sheets

(51) Int. Cl.
  *G06T 7/90*  (2017.01)
  *G06T 7/00*  (2017.01)
  *G06F 18/23213*  (2023.01)

(56) References Cited

FOREIGN PATENT DOCUMENTS

| EP | 3275678 | A2 | * | 1/2018 | ................ B41J 2/01 |
| EP | 3521048 | A1 | * | 8/2019 | ............. B41M 3/06 |
| EP | 3521055 | A1 | * | 8/2019 | ............. B32B 27/10 |
| WO | 2015/104249 | A1 | | 7/2015 | |

OTHER PUBLICATIONS

Written Opinion dated Jan. 7, 2020 relating to PCT/EP2019/078063, 5 pages.

Lutz, Patrik, Chapter 44: Industrial Inkjet Printing in Decorative Web Print Applications, Handbook of Industrial Inkjet Printing: A Full System Approach, First Edition (2018), pp. 747-759.

Eranpurwala, Aliasgar, Chapter 48: Hymmen Digital Decor Printing: Empowering the Laminate Industry, Handbook of Industrial Inkjet Printing: A Full System Approach, First Edition (2018), pp. 817-832.

* cited by examiner

METHOD OF COLOR CORRECT MANUFACTURING DECORATIVE PANELS

REFERENCE TO RELATED APPLICATIONS

This application is a 371 National Stage Application of PCT/EP2019/078063, filed Oct. 16, 2019, which claims the benefit of European Application No. 18200919.1, filed Oct. 17, 2018, the contents of which are incorporated by reference herein in their entirety.

TECHNICAL FIELD

The present invention is related to the manufacturing of decorative panels, such as flooring panels, comprising a digitally printed oligochromatic pattern, such as a wood pattern

BACKGROUND ART

Gravure, offset and flexography are being increasingly replaced for different applications by industrial inkjet printing systems, which have now proven their flexibility in use, such as variable data printing, making short production runs and personalized products possible, and their enhanced reliability, allowing incorporation into production lines.

Inkjet technology has also been implemented by manufacturers of decorative panels. A historical overview and dedicated case studies of an inkjet printing system for printing decorative images on deco-paper to manufacture decorative panels, are disclosed in Chapter 44 "Industrial Inkjet Printing in Decorative Web Print Applications" by Patrik Lutz and Chapter 48 "Hymmen Digital Décor Printing: Empowering the Laminate Industry by Aliasgar Eranpurwala in "Handbook of Industrial Inkjet Printing: A Full System Approach", edited by Werner Zapka (publisher Wiley-VCH Verlag GmbH & Co, 22 Nov. 2017, 984 pages).

The method of manufacturing decorative panels with digitally printed oligochromatic images comprises in the state-of-the-art the following order of steps:
(a) applying a substrate, such as a web substrate;
(b1) digitally printing (220) by a digital printing system an oligochromatic pattern on the substrate to form a decorative layer (250) at time $t_0$;
(c1) impregnating the decorative layer comprising the oligochromatic pattern with a resin;
(d) applying (400) the resin impregnated decorative layer on a core layer (410);
(e) heat pressing (500) the impregnated decorative layer and the core layer to a decorative panel (650) at $time_1$.

Another but less preferred method, which is for example disclosed in WO15104249 in FIG. 2, comprises the following order of steps:
(a) applying a substrate, such as a web substrate;
(b2) impregnating the substrate with a resin;
(c2) digitally printing an oligochromatic pattern on the resin impregnated substrate for forming a decorative layer at time $t_0$;
(d) applying (400) the resin impregnated decorative layer on a core layer (410);
(e) heat pressing (500) the substrate and the core layer to a decorative panel at $time_1$.

Additionally, after said step (e) in both said methods, the decorative panel may be cut in a plurality decorative laminates by a panel cutter.

Due to the heat of the heat presses the step (e) in both said methods is performed in another location, further called a heat press room, because it influences said digital printing system with its heat.

The result of the step (e) cannot be seen by an operator of said inkjet printing system. If color acceptance of the decorative panel after the step (e) is not within a desired range of color acceptances, the whole production of said decorative layer between $t_1$ and $t_0$ may be inacceptable because said production is not within the desired range of color acceptances after the step (e).

A resin impregnation line has a length greater than 20 meters, and mostly also arranged in a separate room, further called a resin impregnation room. So an inacceptable color acceptance results in more than 20 meters wasted substrate which is inkjet printed and impregnated.

Said operator of said digital print system has the ability to adapt said digital printed system or even adapt the oligochromatic pattern so that decorative panels becomes within the desired range of color acceptances but has no idea how the decorative panel shall look like after step (e) at $time_1$.

A possible solution is to provide a camera system in the heatpress room and capturing the result of step e) and providing the captured images to the operator of the inkjet printing system. But also here the whole production of decorative layer between $t_1$ and $t_0$ may be inacceptable because the production of said decorative layer shall not within the desired range of color acceptances after the step (e).

There is also the issue of color correct visualization of said captured images towards the operator of the digital print system, which should be solved. There is also an extra operator at the inkjet printing system needed for controlling said captured images to avoid said waste but this increases the manufacturing cost.

High-speed printing of digital printing systems (>150 meters per minute) become available for manufacturing decorative panels whereby heat pressing shall become a bottleneck due to the slowness of heat pressing. So the time between heat pressing at $time_1$ and the digitally printing an oligochromatic pattern to form a decorative layer at time $t_0$ becomes larger when using said high-speed digital printing systems.

Therefore, there is a need for fast detection of color acceptance for decorative panels and a need for fast detection of color acceptance within a desired range to avoid production waste of decorative panels and/or decorative layers.

SUMMARY OF INVENTION

The problem described above can be overcome by identifying a color acceptance of decorative panels already in front namely between the step of forming the decorative layer (c2) and the step of applying the resin impregnated decorative layer on a core layer (410) (*d*), preferably between the step of forming the decorative layer (b1) and the step of impregnating the decorative layer (c1) for a faster detection of color acceptance for decorative panels.

By identifying color acceptance of decorative panels in front; whereof said color acceptance is outside the desired range of color acceptance; the production waste may shrink seriously when adequate actions are performed. Said shrinkage is economically and ecological beneficial for the manufacturer of said decorative panels.

Preferred embodiments of the present invention have been realised with a decorative panel manufacturing method as defined by claim 1.

DESCRIPTION OF EMBODIMENTS

Figure 1:
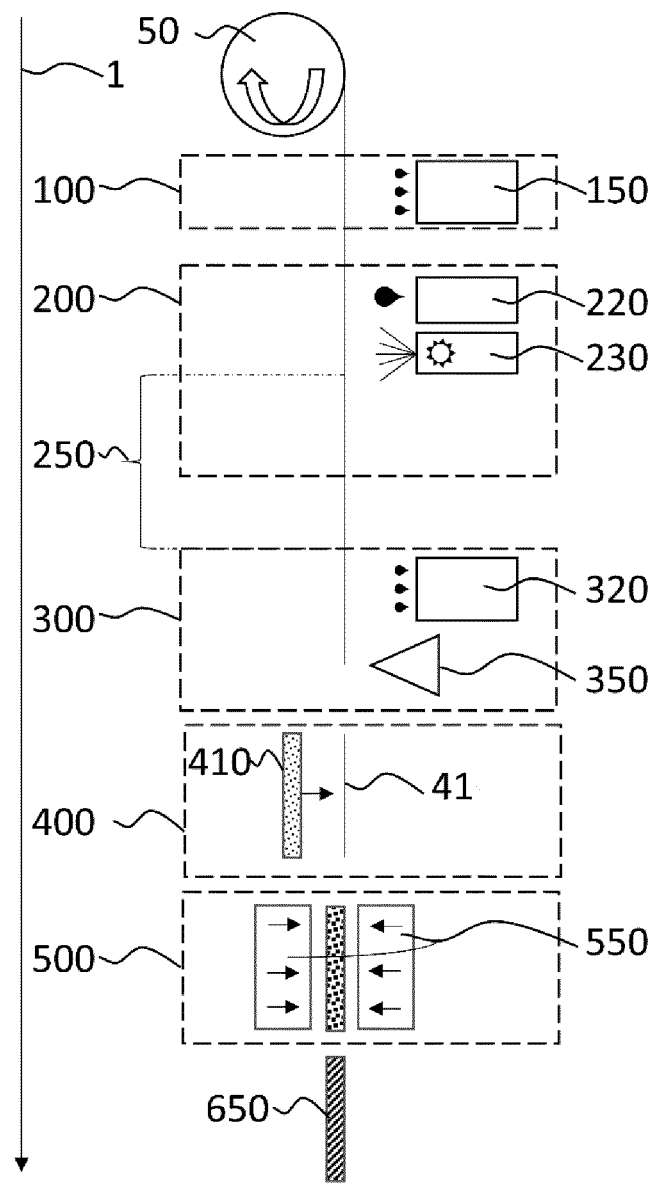
FIG. 1 (FIG. 1) illustrates a prior-art scheme of manufacturing of decorative panels.

The present invention is a method of manufacturing decorative panels comprising the steps:
- inkjet printing on a substrate, preferably a web substrate, more preferably a web paper substrate, an oligochromatic pattern, preferably a wood pattern, by an inkjet printing system to form a decorative layer;
- impregnating by a resin impregnator (320) the decorative layer (250) with a thermosetting resin;
- heat pressing the impregnated decorative layer together with a core layer (410) by a heating press (550) for forming a decorative panel (650);
- wherein the method comprises an extra step of
- identifying a color acceptance of the decorative panel between the step of forming the decorative layer (200) and the step of impregnating the decorative layer.

The first three steps are well-known steps in the manufacturing of decorative panels with digital printed oligochromatic patterns. The decorative layer comprises thus an inkjet printed oligochromatic pattern.

An oligochromatic pattern is a decorative pattern with a few (=oligo, ὀλίγο) colors (chromatic, χρώμα). An oligochromatic pattern is formed by color shade combinations of minimum two and maximum eight dominant color values but mainly maximum five dominant color values. Thus not less than two because it should than be a monochromatic pattern and not more than eight because it should than be a polychromatic pattern.

The inkjet printing system is preferably a multi-pass inkjet printing system but more preferably a single-pass inkjet printing system. The inkjet printing system is for both these preferred embodiments preferably a web-fed inkjet printing system. The need for the present invention is very high for said single-pass inkjet printing system because the printing speed is very high (up to 150 meters per minute).

The decorative layer may comprise multiple copies of the same oligochromatic pattern and/or one or more copies of minimum two decorative oligochromatic patterns. These copies are preferably arranged according to a template, also called a lay-out or arranged by a nesting method, as disclosed in WO 2015117944 (AGFA GRAPHICS NV, UNILIN BVBA).

The identifying step (CA-IDENTIFICATION) is preferably done by a color control unit (250), which results in a competitive advantage whereby the manufacturing of decorative panels is speeded up because there will be less waste and less decorative panels outside the desired range of color acceptances. The color acceptance is compared if it is inside or outside a desired range of color acceptances. If it is outside said range then adequate actions can be performed such as stopping the forming of decorative layers.

Said identification makes the method a cost-saving manufacturing method and facilitates just-in-time manufacturing by decreasing lead times and minimizing excess inventory and avoiding production waste.

Also a faster and adequate action by the operator or by a control system in the inkjet printing system can be taken with the present invention to prevent that color acceptance of decorative panels are going outside the desired range of color acceptances.

The step of identifying comprises preferably the following steps:
- determining a first color value at a coordinate of the oligochromatic pattern;
- color measuring a second color value by using a color measuring device on a position of the decorative layer wherein the position corresponds to said coordinate; wherein the color measuring device is connected to the color control unit (250);
- converting by the color control unit (250), the second color value by a color conversion model to a third color value wherein the color conversion model is predetermined between the step of forming the decorative layer and a step after forming of the decorative panel, such as after the impregnating step, preferably after the heat pressing step of the present invention;
- additionally comparing by the color control unit (250), the first color value and the third color value to determine the color acceptance of the decorative panel.

Preferably the step of comparing comprises the steps of calculating a color difference between the third color value and the first color value and determine the color acceptance of the decorative panel by comparing said color difference if it is within a desired color difference range. Said decorative layer is acceptable if it is within the desired color difference range.

Said color measuring device may be a color-scanner, color camera, densitometer or a colorimeter or preferably a spectrophotometer.

Said measuring is preferably done inline, more preferably done inline with a color line camera, such as an RGB line camera. Measuring inline means measuring on the inkjet printing system and while printing. Therefore, the inkjet printing system has preferably an inspection zone wherein the colors can be measured inline so no cut outs have to be taken from the decorative layer for measuring off-line, which should be time-consuming.

A color value may be defined in an N-dimensional device independent color system (N>1—such as CIELAB or CIEXYZ or as spectral data, which are mostly a plurality of measured discrete points according a set of wavelengths or according a set of wavelength ranges. Also standards as sRGB (IEC 61966-2-1:1999), $IC_TC_P$ or $YC_BC_R$ may be used for defining color values. Between two color values the color difference may be calculated. The most well-known color difference is $\Delta E$ (1976) defined by CIE (Commission Internationale de l'Eclairage), others are $\Delta E_{94}$ and $\Delta E_{00}$. N-dimensional device independent color system is sometimes abbreviated as ND-DIGS.

Also conversion between color values of a N-dimensional device independent color system to color values of another N-dimensional device independent color system is well-known. Detailed information on color measuring, N-dimensional device independent color systems and color values is disclosed in a book "Colour Engineering, achieving device independent colour", edited by Phil Green, Lindsay Mac-Donald, reprint June 2003, ISBN 0-471-48688-4, especially Chapter 2. "Instruments and methods for colour measurement" and Chapter 3. "Colorimetry and colour difference".

In a preferred embodiment the invention comprises an additional step before inkjet printing:
    determining a dominant color value of the oligochromatic pattern; and wherein the first color value is the determined dominant color value, which can be found at said coordinate.

Using a dominant color value of the oligochromatic pattern is advantageous because it is found that these color values mainly determines the color experience of the oligochromatic pattern and it is found to be important for the identification of the color acceptance.

On or nearby the oligochromatic pattern, a color patch may be generated comprising the determined dominant color value; wherein the patch is located at said coordinate. But preferably the color is measured in the oligochromatic pattern itself, thus not on a color patch.

Said color patch is a zone filled in with a certain color value for easily color measuring on a printed color patch. They are mainly square shaped but also circular shaped color patches may be used. For example for square shaped color patches, the side of such patches are between 4 mm and 10 mm, thus rather small.

In the present invention one or more, preferably each, dominant color value of the oligochromatic pattern may be determined and for said dominant color value a color patch may be generated on/at the border of/nearby the oligochromatic pattern for color measuring.

Color patches of one or more or all dominant color values of the oligochromatic pattern are preferably generated next to color patches comprising the color values of the ink-set that is used in the inkjet printing system, such as Cyan (C), Magenta (M), Yellow (Y), Black (K) or preferably C, Red (R), Y, K. Said color patches with color values of the ink-set or lower densities of it may also be measured to identify color acceptance of decorative panels.

It is found that the presence of measurements of a dominant color value of the oligochromatic pattern is of a big importance in the identification of color acceptance of decorative panels at the forming of the decorative layer comprising said oligochromatic pattern. It is also found that the heat pressing step (HEATPRESSING) gives a tremendous change in the color values, especially in said dominant colors, between the forming of the decorative layer and the decorative panel. So the operator has no idea how a decorative layer shall look like after heat pressing. This is caused by the warming up and cooling down of the resin after heat-pressure and the chemical reaction of pigments in ink with substrate and/or the core layer (410) at high temperature and high pressure. This makes the present invention even more important in a method of manufacturing decorative panels. And if the inkjet printing system has possibilities of color adapting said oligochromatic patterns, such as changing ink volumes, according said color acceptance identification and comparing against said desired range, the present invention is highly relevant due to the flexibility in use and versatility of said inkjet printing system.

Core Layers: The core layer (410) is preferably made of wood-based materials, such as particle board, MDF or HDF (Medium Density Fibreboard or High Density Fibreboard), Oriented Strand Board (OSB) or the like. In a particularly preferred embodiment, the core layer is a MDF or HDF board. The color of said core layer may influence also the colors in said oligochromatic pattern.

Paper Substrates: The decorative layer preferably includes paper as substrate. The paper preferably has a weight of less than 150 g/m², because heavier paper sheets are hard to impregnate all through their thickness with a thermosetting resin. Preferably said paper layer has a paper weight, i.e. without taking into account the resin provided on it, of between 50 and 170 g/m². If the weight of the paper is too high, then too much resin is needed for sufficiently impregnating the paper reliably. Preferably, the paper sheets have a porosity according to Gurley's method (DIN 53120) of between 8 and 25 seconds. Such porosity allows even for a heavy sheet of more than 150 g/m² to be readily impregnated with a relatively high amount of resin. The use of said paper substrate, especially when one or more ink-receiving layers are applied, makes that inkjet ink is penetrating easily into the core of the substrate, which may influence the colors with a low luminance and/or high chroma. It is found that the color of said paper substrate also influences the colors in said oligochromatic pattern.

Said impregnated paper becomes translucent, preferably transparent, after heat pressing so that the oligochromatic pattern of the decorative layer can be viewed with enhanced chroma and/or reduced luminance inside said translucent or transparent paper.

Thermosetting resins: The thermosetting resin is preferably selected from the group consisting of melamine-formaldehyde based resins, ureum-formaldehyde based resins and phenol-formaldehyde based resins. Most preferably, the thermosetting resin is a melamine-formaldehyde based resin, often simply referred to in the art as a 'melamine (based) resin'. The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, which the present invention is of interest. It is found that the type of thermosetting resin and the applied thickness determines also a change in the color values, specially the color values of the dominant colors, of the oligochromatic pattern on the decorative layer.

Figure 2:
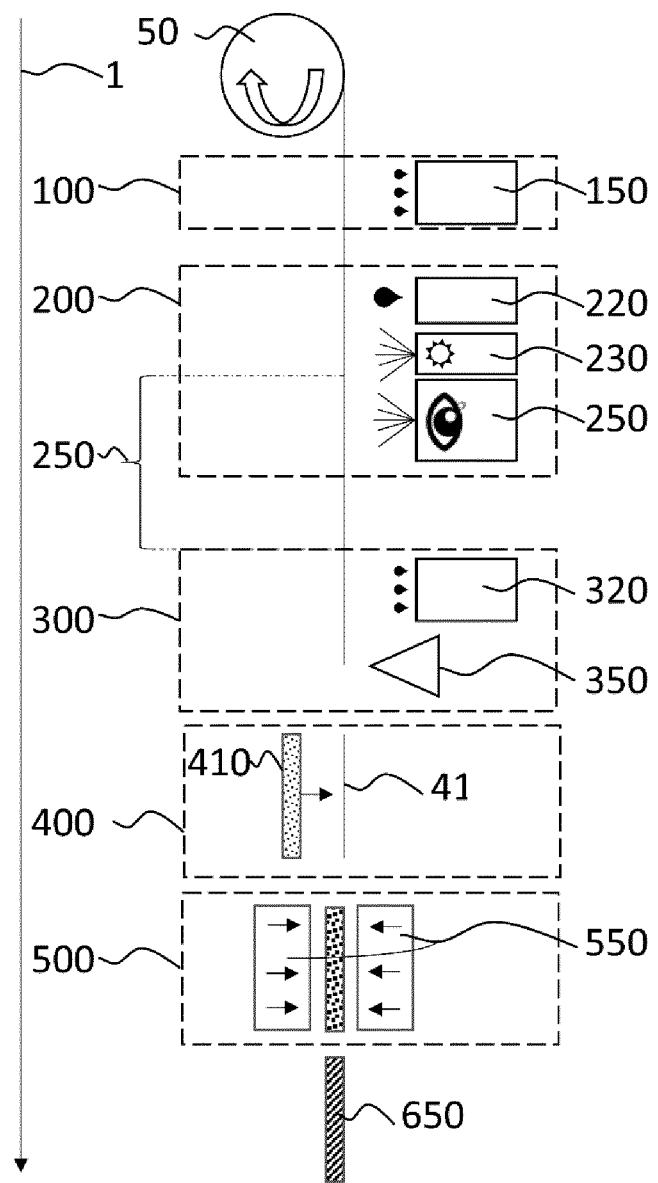
FIG. 2 (FIG. 2) illustrates a scheme for a preferred embodiment of manufacturing decorative panels from the present invention.
Figure 3:
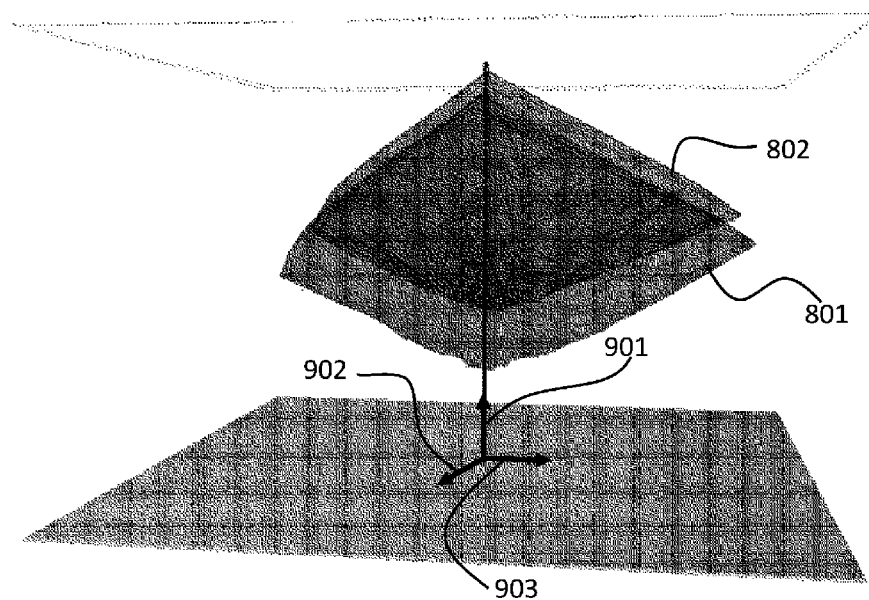
FIG. 3 (FIG. 3) shows an example of a first color gamut (801) and a second color gamut (802) wherein the first gamut is determined after heat-pressing according to a disclosed manufacturing method of decorative surfaces, namely wherein the substrate is paper, sucked in a thermosetting resin and heat pressed on HDF and the second gamut is determined before heat-pressing and applying said thermosetting resin. This shows the tremendous colour gamut change after heat pressing. Both color gamuts (801, 802) are shown in CIELAB color space wherein a first axes (901) is for determining the L-value, also called luminance value, a second axes (903) for determining the a-value and a third axes (904) to determining the b-value.
Figure 4:
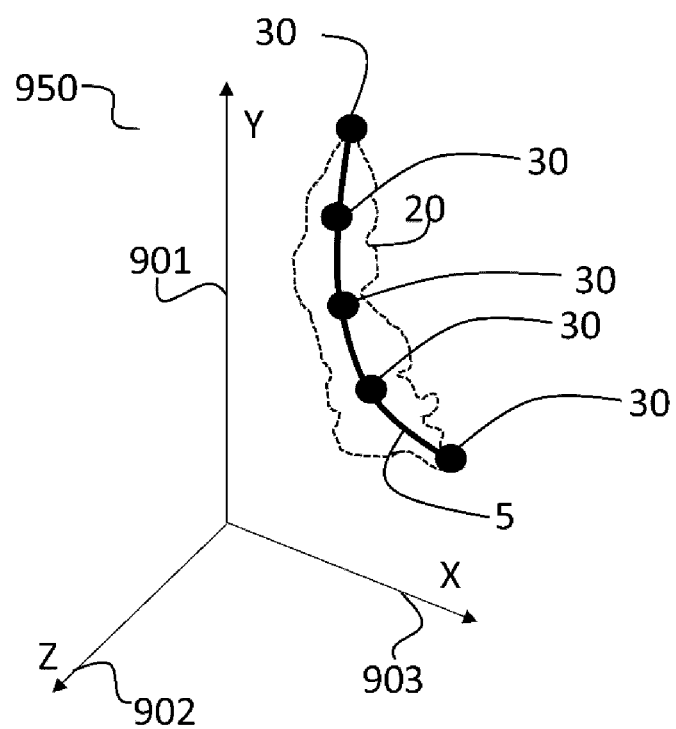
FIG. 4 (FIG. 4) illustrates an image-gamut (20) of an oligochromatic pattern with a thinned version of it as a skeleton (5) comprising a plurality of points (30) in CIELAB color space (950) wherein a first axes (901) is for determining the L-value, also called luminance value, a second axes (903) for determining the a-value and a third axes (904) to determining the b-value.

Ink-receiving Layers: For forming the decorative layer, aqueous pigmented inkjet inks are preferably inkjet printed on one or more ink-receiving layers present on a paper substrate. It is also possible to omit the one or more ink-receiving layers by using a polymer latex binder However, most preferably one or more ink-receiving layers are used for maximizing the image quality. Thereafter, the inkjet printed paper substrate web is impregnated by a thermosetting resin. The step of applying an ink-receiving layer (100) is illustrated in FIG. 1 and FIG. 2 by jetting droplets to form said ink receiving layer.

The ink-receiving layer may consist of a single layer or may consist of two, three or more layers, wherein each layer may have a different composition. An ink-receiving layer preferably includes a polymeric binder and, for fast drying of the inkjet printed ink, preferably also an inorganic pigment. The ink-receiving layer(s) can be coated onto the support by any conventional coating technique, such as dip coating, knife coating, extrusion coating, spin coating, slide hopper coating and curtain coating. Alternatively the ink-receiving layer(s) can also be applied by a printing techniques, such as flexographic printing or valvejet printing.

It is found that the type and color of the one or more ink-receiving layer determines also a change in the color values, specially the color values of the dominant colors, of the oligochromatic pattern applied on the substrate comprising said one or more ink-receiving layer. Also in the heat-pressing step the color of said ink-receiving layer is changed.

In a more preferred embodiment of the inkjet printing method, the at least one ink-receiving layer contains a polyvinylalcohol polymer and an inorganic pigment. In a particularly preferred embodiment of the inkjet printing method, an outermost ink-receiving layer contains no inorganic pigment or contains a smaller content of inorganic pigment than an ink-receiving layer between the paper substrate and the outermost ink-receiving layer.

It is found that pigments or polymers in said ink-receiving layers, influences the color of printed oligochromatic pattern and influences the color of said pattern after heat-pressing.

Oligochromatic Pattern

An oligochromatic pattern is a decorative pattern, such as wood pattern, stone pattern or phantasy repetitive pattern but most preferably a wood pattern (e.g. hardwood pattern, oak wood pattern, teak wood pattern with a few (=oligo, ὀ λίγοι) colors (chromatic). Thus not a monochromatic image, which is an image with one (=mono) color and thus also not a polychromatic image, which is an image with a plurality of colors such as a photographic image with content of nature scenery, which comprises also multiple objects instead of maximum eight objects in such oligochromatic pattern. The few colors of an oligochromatic pattern are called further dominant colors, whereof each has a certain color value.

The oligochromatic pattern is in the present invention a digital image which may be stored in memory of a system for example in BMP-format, TIFF-format or PDF-format. Said pattern is then in the present invention inkjet printed on a substrate.

An oligochromatic pattern is in the present invention preferably a wood pattern or stone pattern.

A wood pattern is a region-of-interest of a wood image so variances in wood patterns may be achieved by selecting different region-of-interests in a wood image. The variances of such wood patterns have a similar background color.

The content of a wood pattern is, similar as a wood image, preferable defined in raster graphics format but more preferably in vector graphics format, wherein the wood pattern as raster graphics format is embedded. A wood pattern may be stored and/or loaded as one or more files on a memory of a computer. The embodiment may comprise a method to load a wood pattern to a memory of a computer.

The tone in a wood pattern, also called background color of a wood pattern or wood color of a wood pattern, may be calculated by determining the color in a color histogram of the wood pattern, namely the color that dominates the most in the color histogram. Said determination of background color may also be done by using singular value decomposition techniques.

The contrast color of a wood pattern is a color in the wood pattern which has the highest color difference with the background color such as the highest delta E in CIELab. The colors in wood grain lines, wood pores and/or wood imperfections are in most wood patterns determined nearby the contrast color.

The wood grain lines are also called wood nerves. A higher frequency, sometimes called density, of wood grain lines may be caused by smaller growth rings in the wood that the wood image represents. The wood pattern may also comprise wood pores and/or wood imperfections such as knots and cracks.

Inkjet Printing System

An inkjet printing system, such as an inkjet printer, is a marking device that is using a print head (220) or a print head assembly with one or more print heads, which jets a liquid, as droplets or vaporized liquid, on an inkjet receiver, also called print-media or substrate. A pattern that is marked by jetting of the inkjet printing system on an inkjet receiver may be an achromatic or a chromatic colour.

A print head (220) is a means for jetting a liquid on a substrate through a nozzle. The nozzle may be comprised in a nozzle plate, which is attached to the print head (220). A print head (220) preferably has a plurality of nozzles, which may be comprised in a nozzle plate. The liquid is preferably an ink, more preferably an UV curable inkjet ink or water based inkjet ink, such as a water based resin inkjet ink. The way to incorporate print heads into an inkjet printing system is well-known to the skilled person.

A print head (220) may be any type of print head such as a piezoelectric print head, thermal print head, a continuous print head type, electrostatic drop on demand print head type or acoustic drop on demand print head type or a page-wide print head array, also called a page-wide inkjet array. The print head (220) is preferably a piezoelectric print head because it is found that said print head is more reliable in an industrial environment with a lot of dust, such as paper dust and ink-receiving layer dust coming from the substrates whereon is printed, than the other types of print heads such as a thermal print head. The advantage of said print head is that by enhancing a voltage, the amount of an ink droplet from one or more nozzles may be controlled, for example to control that the color acceptance remains in said desired range.

The inkjet printing system is preferably a web-fed inkjet printing system, which comprises means for transporting web substrates whereon, with a plurality of inkjet printheads, a pattern is printed for forming a decorative layer. The plurality of inkjet printheads are preferably comprised in an inkjet printhead unit and more preferably comprises an inkjet ink set for printing said oligochromatic pattern. A web-fed inkjet print system may mark a substrate with a single pass printing method or by a multi pass printing method. The possibilities of change fast between print jobs and the possibilities to organize the priority between print jobs, makes it possible to use the web-fed inkjet printing system of the present invention as a proofer for decorative panels (=panel proofer), before large production with conventional printing systems (gravure, offset and flexography) is started up. Decorators and decorative image designers have now the possibility to have fast a sample of a new created decorative panel.

The web-fed inkjet printing system comprises means for transporting one or more than one web substrates for printing a plurality of decorative layers. The more than one web substrates may be a slitted web substrate after printing, more preferably are unwounded, thus supported, at the input of the web-fed inkjet printing system each from a roll of substrate.

A roll comprising a web substrate is mounted on a web supply, which implements one or more spindles. The spindles are rotatable by distributing torque from the drive shaft by a drive mechanism. Such shaft and roll handling are well-known in the state-of-the-art of manufacturing decorative panels.

The web-fed inkjet printing system preferably comprises a drying device (230) for the drying of the inkjet printed oligochromatic pattern. Said drying device (230), such as radiation curing device or infra-red dryer, depends on the type of inkjet ink that is used in the web-fed inkjet printing system.

The transport of the decorative layers to the heat press or impregnation line may be performed by one or more joining stations and/or one or more transport tables and/or one or more conveyor modules up to the heat press or impregnation line. Before the entrance of the decorative layer, whether or not with other layers such as a core layer (410), the layer may be supplied in a fully automated laying area. After the heat pressing the decorative panel may be supplied to a stacking area.

The web-fed inkjet printing system preferably comprises a web guide and/or a web substrate spreading device for providing a straight transport underneath the plurality of inkjet print heads. Wobbling, web swimming of the web substrate may give color deviations in the decorative layer due to bad color-on-color registration.

In a preferred embodiment, the inkjet printing system comprises one or more nip rolls at the winding of the decorative layers or at the transport towards the heat press and/or impregnation line to avoid telescoping of rolls and/or to avoid/reduce wrinkles. Said nip rolls are especially advantageous when positioned after said dryer, preferably directly after said drying device (230), which dries the inkjet printed oligochromatic pattern.

In another embodiment a pushing down mechanism is attached in the inkjet printing system for pushing down the substrate while printing an oligochromatic pattern and/or while drying an inkjet printed oligochromatic pattern. It is found that due to the ink absorbance of the substrate and the drying of inkjet printed substrate, said substrate wrinkles, especially when the substrate has a paper weight below 150 g/m2 and a has a porosity according to Gurley's method (DIN 53120) between 8 and 25 seconds. The pushing down mechanism is preferably a flat bar which is positioned parallel and elongated to the print direction and mounted parallel to the support plane above the transport system of the inkjet printing system.

Inkjet inks used in the present inkjet printing system are preferably pigmented inkjet inks as the use of colour pigments provide higher light stability to the decorative laminate panels than dyes, and more preferably pigmented aqueous inkjet inks. An aqueous inkjet ink preferably includes at least a colour pigment and water, more preferably completed with one or more organic solvents such as humectants, and a dispersant if the colour pigment is not a self-dispersible colour pigment.

The inkjet inks are composed into an inkjet ink set having differently coloured inkjet inks. The inkjet ink set may be a standard CMYK ink set, but is preferably a CRYK ink set wherein the magenta (M) ink is replaced by a red (R) inkjet ink. The use of a red inkjet ink enhances the colour gamut for wood patterns, which represent the majority of decorative laminates in flooring laminates.

In the preferred embodiments of the present invention wherein a color control unit (250) is comprised, the color control unit (250) preferably comprises means for adapting the maximum and/or minimum jetting amount of a nozzle or a set of nozzles in said print head, for example when piezoelectric print heads are used, by changing the voltage applied on the piezo elements of such print heads.

Said adapting means, also called an adapter, adapts preferably additionally the maximum and/or minimum jetting amount according the desired range of color acceptances.

The minimum jetting amount of a nozzle or a set of nozzles is the minimum ink amount when the nozzle or the set of nozzles of a print head are jetting one drop. The maximum jetting amount of a nozzle or a set of nozzles is the maximum ink amount when the nozzle or the set of nozzles of a print head are jetting one drop. It is mostly measured in pL (pico liter).

With said means for adapting the ink amount (smaller/larger), which result in a changed luminance which can bring the decorative panels back into the desired range of color acceptances. The possibility of adapting the jetting amount makes it possible to color control the decorative layer preventive to be sure that the color acceptance of the decorative panel, comprising said decorative layer is in the desired range of color acceptances.

In a preferred embodiment of the present invention, the decorative layer is marked with a mark, preferably by said inkjet printing system, when the color acceptance is out the desired range of color acceptances. When the decorative layer is impregnated or heat pressed, the production can be diverted to a waste system to minimize the production time when such mark is detected by an operator or preferably by a vision system. Such mark can be text, an image, such as an icon, but also a bar code or matrix code, such as a QR-code, which are readable by a vision system to interpret info encoded in such bar codes. Preferably the decorative layer may be marked with a mark, preferably by said inkjet printing system, comprising info, also called content, wherein said info comprises the calculated value of color acceptance.

A more general name for bar code or matrix code and similar codes is a machine readable code. In a preferred embodiment the machine readable code comprises content that is directly or indirectly connected to a customer and/or the calculated value of color acceptance. The advantage of said preferred embodiment is that the marking may be applied by the inkjet printing system of the present invention so a fast detection can be achieved by operator or vision system, which result in reducing the production waste.

Such machine readable code may also be used for at least one of the following purposes:

a) identifying a set of decorative laminate panels to be manufactured for a customer;
b) identifying a decorative layer manufacturer;
c) identifying a oligochromatic pattern to be inkjet printed;
d) identifying a decorative panel manufacturer.

The machine readable code may also comprise the color values of dominant colors of the oligochromatic pattern. This is handy when reprints are needed for decorative panels with a certain oligochromatic pattern.

A vision system can be a barcode-reader, a camera or even a camera incorporated in a mobile device such as a mobile telephone or tablet PC. Detection of decorative layers with said marks and/or determination content from said mark if a decorative layer shall become outside the desired range after heat pressing, makes the manufacturing of decorative panels have a profound and positive effect on costs and speed to market in addition to customer satisfaction and overall profitability and better manufacturing efficiencies.

In the preferred embodiments of the present invention wherein a color control unit (250) is comprised, the color control unit (250) preferably comprises means for adapting the data of the oligochromatic pattern, which are sent to the inkjet printing system for printing. Said adaptation may be said adequate actions for controlling that decorative layers have a color acceptance for decorative panels inside said desired range.

The adaptation is preferably performed on the fly, which means while forming decorative layers. Preferably said adaptation comprises applying a gamma curve or a dot gain curve on the data of the oligochromatic pattern, which are sent to the inkjet printing system for printing. After the application of said curve, the data of the oligochromatic pattern is halftoned, preferably by an error diffusion halftoning method or a dither halftoning method to prepare it for sending to the print heads of the inkjet printing system. The dither halftoning method is preferably a blue noise dither halftoning method or an error diffusion halftoning method, because they results in less visible halftone patterning than when amplitude modulation is used as halftoning method.

In a more preferred embodiment the data of the oligochromatic pattern is adapted by a color conversion model previous the application of said curves and/or the halftoning method. The color conversion model is preferably calculated based on the measured data in the present invention and/or previous color measured data on decorative layers, and/or previous color measured data on the product after impregnation and/or previous color measured data on the decorative panel (thus after heat pressing). The possibility of adapting the data of the oligochromatic pattern, which are sent to the inkjet printing system for printing makes it possible to color control the decorative layer preventive to be sure that the color acceptance of the decorative panel, comprising said decorative layer is in the desired range of color acceptances. The low memory and the fast calculation of said color adaption makes it very convenient for the manufacturing and color controlling of decorative panels.

Color Acceptance

The color acceptance, in the present invention, is for the decorative panel, thus after the time the decorative panel is manufactured. The present invention calculates this color acceptance in front before the decorative panel is manufactured, which is an advantage. This makes that less waste is achieved in the production and manufacturing of decorative panels because bad decorative layers, which shall have an unacceptable color acceptance for the decorative panel when included in a decorative panel, can be detected early in the manufacturing process. The operator can stop, as adequate action, the manufacturing method and/or divert manually or automatically said bad decorative layers to waste. Said bad decorative layers doesn't become decorative panels by the present invention.

Color acceptance for a decorative panel can be measured for example by comparing the colors with other decorative panels comprising the same oligochromatic pattern but also by defining the maximum color difference of a dominant color, which is presented in the oligochromatic image and which is included in the decorative panel.

A color may be defined by several methods such as color naming's for example Pantone™ Color. A better way of defining colors is defining a color in a N-dimensional device independent color system, such as CIELAB.

By measuring a color in a color space or in spectral values and comparing it with the desired color, a color acceptance of the measured color can be calculated.

An example of color acceptance from a decorative panel could be that a certain color in an oligochromatic pattern with a certain color value is measured on the decorative panel. The color acceptance between said color value and measured color value is okay if the color difference the measured color is below 2 $CIELAB_{76}$ $\Delta E$ and not okay if it is larger or equal than 2 $CIELAB_{76}$ $\Delta E$.

Color difference or color comparing is known in the state-of-the-art for example $CIELAB_{76}$ $\Delta E$-formula ($=\Delta E^*_{ab}$). The comparing of such colors is mainly done by calculating the distance in the N-dimensional device independent color system between the measured color and the desired color. Other color difference formula are CMC(l:c); $\Delta E^*94$, $CIELAB_{2000}$ $\Delta E(=\Delta E^*_{00})$. If the color acceptance is within a desired range, for example between 0 and 2 $CIELAB_{76}$ $\Delta E(=\Delta E^*_{ab})$, which may be determined by the industry of manufacturing decorative panels or the customers of such decorative panels, a decorative panel may be ready for sale.

Color Conversion Model

The color conversion model is a mathematical relation that expresses color values achievable at the forming of the decorative layer in function of color values achievable at the forming of the decorative panel, thus in the present invention after the heatpressing step.

Based on sampling points in a colorant space, which are measured in a N-dimensional device independent color system or with spectral values, at the forming of the decorative layer, and the corresponding sampling points, which are measured after the forming of the decorative panel in the same N-dimensional device independent color system or in another N-dimensional device independent color system or with spectral values, a correlation can be found between these sampling points. Said correlation is preferably defined in LUT's wherein each color achievable at the forming of the decorative panel can be calculated with mathematical expressions to a matching color achievable at the forming of the decorative panel or vice-versa.

A well-known N-dimensional device independent color system is CIELAB. An architecture or framework for said color conversion model, that is widely known, is defined by the International Color Consortium (ICC) in Specification ICC. 1:2001-12 "File Format For Color Profiles". The ICC framework provides for characterizing an imaging device using a device profile such as an "ICC profile". The ICC profile for an imaging device specifies how to convert to/from device dependent color space from/to a N-dimensional device independent color space so that images may be communicated from one device to another.

By measuring color values in said oligochromatic pattern, said LUT's may be adapted to have a color conversion model which guarantees at the time of printing color correct decorative panels. This is especially useful when reprints of decorative panels are ordered. The advantage is that only a limited number of colors are measured and the adaptation of said color conversion model can be done fast with a minimum usage of memory based on said limited measurements. By comparing said LUT's with the limited measurements, using interpolation techniques and mappings, said LUT's can be fast adapted. Instead of color calibrating and color linearization with a large number of colors.

Color Control Unit (250)

The color control unit (250) in the present invention has the capability to identify a color acceptance of the decorative panel between the step of forming the decorative layer and the step of impregnating the decorative layer. In a preferred embodiment the color control unit (250) can control the inkjet printing system such that the color acceptance achieves a desired color acceptance of a decorative panel.

The color control unit (250) is preferably extended for keeping track of all data related to a given print job of an oligochromatic pattern such as said pattern itself, type of the inkjet printing system, the substrate used, the ink receiving layer characterization, the ink set, the printing mode comprising print resolution, number of passes . . . , the calibration setup and the color conversion model(s) used. Said data is stored in a storage device, such as random access memory, which may be part of a database.

The color control unit (250) may be implemented as a computer module, which is stored in a hardware configuration (HW) that may perform the present invention as computer implemented method. The hardware configuration may be a computer, tablet computer and the like, comprising a central processing unit (CPU), a memory, a storage device such as a hard disk drive (HDD), a communication interface (IF) device that sends and receives data to and from other hardware configurations via a network. In a preferred embodiment, the present invention is performed by one or more GPU's. Graphic Processing Units (GPU's) may be used for efficient calculation of said color acceptance or faster calculation in the color control of the inkjet printing system due to their highly parallel structure, making them more efficient than Central Processing Units (CPU's).

The hardware configuration may comprise a user interface (UI) device that may comprise a display device, which gives a result or analysis of the present invention such as result of the color acceptance calculation.

The database in the color control unit (250) may be used additionally for tasks, especially when a color measuring device is connected to the control unit of the present invention, such as

- process control of the whole manufacturing line of the present invention and/or
- evaluation printing system for color behavior analysis, missing nozzle detection, substrate defect analysis; and/or
- color correction such as (re)calibration, (re)color profiling, color adjustments, whether or not on-the-fly, which means while printing one or more copies of said oligochromatic pattern by the inkjet printing system to form a decorative layer; and/or
- making color accurate reprints of oligochromatic patterns which were printed in the past; and/or
- inkjet printhead calibration; and/or inkjet printhead alignment.

The evaluation of prints by the color control unit (250) is mainly based on color differences but may also be based additionally on print defects such as substrate non-uniformity, ink-receiving layer non-uniformity, printing artefacts such as missing nozzles, and banding.

Missing nozzles means that one or more nozzles is not printing, which results in a minor quality of a printed copy of the oligochromatic pattern. Banding means the incorrect positioning of printed droplets on the substrate, which results in color deviations that are visible as bands, mainly rectangular bands, in the printed copies. This can for example be caused by irregular transport-speed of the substrate.

The goal of the color control unit (250) of the present invention, especially when a color measuring device is connected to the control unit, is for (automatic) defect detection to prevent waste during the heat-pressing step but it may also be used, in an advantageous way, to achieve: improving print quality such as preserving color consistency during the production run, which means for multiple copies of an oligochromatic pattern by the inkjet printing system for forming a decorative layer. Thus the color control unit (250) can be used as an inventive automation approach in which the manufacturing of decorative panels are produced in a shorter time frame with less waste by controlling the whole manufacturing from design of the oligochromatic pattern till the final production step of the decorative panel.

For testing the effectiveness of the present invention, an adapted version of Agfa™'s PressTune™ is used. It is an existent product of Agfa™ that tends to work with offset printing to achieve increased press stability on an offset press and tracking the print quality, storing the results and offer instant feedback on print quality to all stakeholders while producing a print on the offset press. It is designed for conventional printing such as offset, gravure, lithography and coldset and had to be adapted for using in the manufacturing line of decorative panels of the present invention with its inkjet printing system, wherein a serious lower amount of copies of an oligochromatic image is printed, what is typical for digital industrial printing.

The existent product is adapted for the present invention to work also as a detector for defects and potential assignable causes, which is a pillar for process control and adapted by adding methods for calculation corrections based on said detected defects and by applying said calculated corrections, preferably while printing copies of an oligochromatic patterns.

So the present invention comprises preferably an inkjet printing system that is equipped with said control unit, which is preferably a software implemented application, wherein said color control unit (250) is connected or linked to a color measuring device for collecting measuring data from it and for storing the measuring data in a database in a memory, which is accessible by the color control unit (250). Said control unit is preferably connected to a user interface for visualizing the status of the prints in the form of control charts comprising data generated from the measuring data, such as X-bar control charts, R-charts, t-distribution charts or trend lines. The printed copies of oligochromatic patterns are preferably measured continuously, also called on-the-fly, for example by a color measuring device, to get measured data. The measured data is than processed by said control unit, which preferably extracts and preferably collects only the relevant information out the measured data for the analysis of the printed oligochromatic patterns and the identification of the color acceptance of the final product, namely the decorative panel, at the time of forming the decorative layer. Also the $L^*$, $a^*$ and $b^*$ value of CIELAB may be viewed from measurements left, middle and/or right on the decorative layer.

In case the color acceptance is out of tolerance, thus a non acceptable identified color acceptance, the color control unit (250) may start a control action plan, which may comprise for example the adaptation of the oligochromatic pattern so the color acceptance is again in the range of the specification of color acceptance.

The color measuring device is preferably a RGB line scanner, which are known in the field of machine vision. The connection of a color measuring device to the color control unit (250) may be performed by a linkage via a network, such as a LAN (=local area network)

Additionally the following data may also be stored in the memory accessible by the color control unit (250):

color and/or gloss of the substrate whereon is printed by the inkjet printing system; and/or;
color gamut, grey balance, fading; and/or
color conversion model; and/or
GCR/UCR settings; and/or
calibration info and characterization info; and/or
skeleton of the image-gamut of the oligochromatic pattern; and/or
type of used ink-receiving layer(s), whether or not applied by the inkjet printing system and the thickness of said ink-receiving layer(s); and/or
ink consumption: total amount of ink, number of inks used, type of inks All said data is preferably needed for re-printing exactly the same way of an oligochromatic pattern. Therefore also, the following data may be needed: name of the oligochromatic pattern, data and time of the print job and/or skeleton of the image gamut of the oligochromatic image.

The printed oligochromatic patterns are measured by said color measuring device for example by added patches, sometimes called control charts. Said added patches are preferably done by one of the described preferred embodiments of the present invention.

The color control unit (250) preferably comprises the following steps:
determine whether the process variation is in control: out-of-control points in the measuring data, or data calculated of it, can influence the estimates of process parameters and prevent control limits of truly representing the process. If out-of-control points are due to special causes then said points need to be omitted from identifying the color acceptance;
determine whether the process mean is in control;
identify which points of the measured data, or data calculated from it, failed each test.

The control charts calculated from said measured data, or data calculated from it, can indicate control conditions even if no single point in said data is outside of control limits, which may be regulated by patterns: cyclic patterns; shift in process level, trend, stratification or lack of variability . . . .

The color measuring device in the present invention may be an RGB line-scanner but it is preferably a spectral measurement line-scan imaging sensor for acquiring line per line a decorative layer, printed by the inkjet printing system; wherein the lines may be formatted to spectral measurement rows. Such row comprises more than one spectral responses within a spectral range per pixel in that row. The spectral range may be a red spectral band, green spectral band, blue spectral band and/or infrared spectral band. The different spectral ranges may be in overlapping spectral sensitivity curves. Said color measuring device preferably is capable of sensing in a plurality of different spectral ranges.

The color measuring device and/or the color control unit (250) is preferably capable of determining wood grains or wood imperfections in an oligochromatic pattern of a decorative layer, when the oligochromatic pattern is a wood pattern.

Dominant Color Determination

In the present invention the following additional step is preferred:
determining a dominant color value from an oligochromatic pattern. The first color value of the present invention is more preferably said determined dominant color value. The step of determining a dominant color may comprise a step of calculating color histogram of color values from the oligochromatic pattern, and additionally more preferably applying a weight depending on the found frequencies in said color histogram calculation. The step of determining a dominant color may comprise a step of singular value decomposition method.

It is found that for identifying color acceptance of decorative panels, at the forming of the decorative layer, the measurement of a dominant color of the oligochromatic pattern is a benefit for accuracy and better determination of the color acceptance. It is found that serious color shifts occur at said dominant colors when impregnating and/or heat pressing the decorative layer.

The step of determining a dominant color is preferably done by the following steps:
determining a image-gamut (20) in a N-dimensional device independent color system (N>1) of the oligochromatic pattern; and
thinning the image-gamut (20) to a skeleton (5) in said N-dimensional device independent color system; and
selecting a point on the skeleton (5) as the dominant color value; wherein the point is substantially an inflection point, cross point or end point. Said image-gamut (20) is a sub-space in said N-dimensional device independent color system wherein each color value, determined/converted in said color space, of the oligochromatic pattern is part of said sub-space. Said image-gamut (20) is thus a collection of color values defined for a certain N-dimensional independent color system; whereof said color values are comprised in said image. Said image-gamut (20) may have a confined volume, which is a volume wherein said color values belong.

Said image-gamut (20) of the oligochromatic pattern can be thinned to connected N-dimensional points, also called N-dimensional points. Two of said N-dimensional points are connected by a sub-path and the whole tinned image-gamut of the oligochromatic pattern forms a skeleton (5) of connected sub-paths between said N-dimensional-points. Thinning algorithms are well-known. Some of them are disclosed in Chapter 9 of "Algorithms for Graphics and Image Processing", by Theo Pavlidis, ISBN 0-914864-65-X, published by Computer Science Press, 1982.

A skeleton (5) is a narrowed version of an N-dimensional-object in an N-dimensional-space. In the present invention is said N-dimensional-object an image-gamut (20) of an oligochromatic pattern. A skeleton (5) in said N-dimensional-space comprises N-dimensional-points, preferably 3D-points forming a wire or multiple wires with linked or connected N-dimensional points. The skeleton (5) forms between said linked N-dimensional points preferably one path or a path with a set of side paths. Two of said N-dimensional-points are linked or connect together by a sub-path. A path is a sequence of minimal one such sub-paths. The skeleton (5) of an image-gamut (20) of an oligochromatic pattern has a path with a maximum of 5 side paths. If the oligochromatic pattern is a wood pattern it is found that, the skeleton (5) has maximum 2 side paths but mostly no side paths.

A sub-path may be a straight line but also a curve defined as a N-dimensional-function between N-dimensional-points such as a polynom, Bezier curve or a parametric equation. The linked or connected sub-paths that forms said skeleton (5) are not necessary defined by the same N-dimensional-function. A N-dimensional-point is preferably defined as a point with N coordinate values as used in a Cartesian coordinate system. A polar coordinate system may also be used. A skeleton (5) may be a medial axis of said N-dimensional-object.

Determining a skeleton (5) in an N-dimensional independent color system may be done by one or more morphological operation on said space. For example when N=3 the determined and calculated image-gamut (20) of the oligochromatic pattern may be sliced by a plane in the three-dimensional color space. From this slice, which is than a 2D slice image, the contour from the image-gamut (20) in said plane can be calculated. The centre of said contour may be than a 3D-point of said skeleton (5). The slicing with parallel planes through said image-gamut (20) and the defining of the centre of contour in the generated 2D slice images, may be used to form the skeleton (5) of the image-gamut (20) of the oligochromatic pattern. If the color space is for example CIELab, than the parallel planes for slicing are preferably parallel to the L-plane, which is the luminance-plane. So for a certain number of luminance-ranges a 3D-point is generated, which becomes part of the skeleton (5). The 3D-points may than be connected with a sub-path, for example with straight lines as 3D-function, which forms than a skeleton (5), which is a thinned version of the calculated image-gamut (20) of the oligochromatic pattern, such as a wood pattern. The more slices are performed how more detailed the skeleton (5) of the image-gamut (20) if the oligochromatic pattern is.

It is found that using the step of thinning the dominant colors can be determined on said skeleton (5) and that a color value of a dominant color of an oligochromatic pattern, and thus a dominant color, can be determined in a point on said skeleton (5), which is substantially an inflection point, cross point or end point on said skeleton (5). The step of thinning preferably comprises a step of calculating the color histogram of color values of the oligochromatic pattern for applying a weight depending on the frequencies of said color values so the determination of a dominant color of a oligochromatic image can more easily be found.

Another step of determining a dominant color is preferably done by the following steps:
  converting the oligochromatic pattern to a image-gamut (20) in a color space;
  clustering color values in the image-gamut (20) into K clusters by K-means clustering;
  selecting a cluster of said K clusters; and selecting a point of the cluster as the dominant color value; wherein the point is substantially a centroid of the cluster or a point in the cluster with substantially the highest chroma and/or lowest luminance. The color space is preferably an independent color space. k-means clustering is a method of vector quantization, originally used in signal processing, that is popular for cluster analysis in data mining.

From a determined dominant color of the oligochromatic value, a color patch can be generated, which is printed nearby the oligochromatic value when forming the decorative layer. Said color patch can then be measured by the color measuring device of an embodiment of the present invention.

Another Preferred Embodiment

In another preferred embodiment the first color value is determined as followed:
a) determining an image-gamut (20), in a N-dimensional device independent color system (N>1), of said oligochromatic pattern; wherein said image-gamut (20) comprises color values of said oligochromatic pattern; and
b) determining a skeleton (5) of said image-gamut (20) wherein said skeleton (5) comprises a plurality of points which are determined by:
b1) selecting a range, along a determined axis in said N-dimensional device independent color system; and
b2) determining a sub-image-gamut (250) of said image-gamut; wherein said sub-image-gamut (250) comprises color values whereof a projection towards said determined axis belongs to said range; and b3) determining a color value in said sub-image-gamut as a point of said skeleton (5);
and wherein the first color value is a selected color value wherein minimum color difference between said selected color value and skeleton (5) is smaller than 3 $\Delta E_{CIELAB,94}$.
An axis is hereby a straight line determined in said ND-DIGS, which may be an axis of the coordinate system of said ND-DIGS. Said axis is preferably determined as a straight line that substantially defines a line of symmetry of said image-gamut (200) or is oriented substantially parallel along said image-gamut.

Step b1) and b2) is in a preferred embodiment:
b1) selecting a luminance-range for color values in said N-dimensional device independent color system; and
b2) determining a sub-image-gamut of said image-gamut (20); wherein said sub-image-gamut corresponds to said luminance-range and comprises color values which have a luminance in said corresponding luminance range.

Said selected color value is preferably a balance point of said sub-image-gamut and more preferably a centroid of said sub-image-gamut.

Preferably is said selected color value an end point, an inflection point and/or a cross point of said skeleton (5).
Luminance-Factor/Lightness Luminance-factor a photometric measure of the luminous intensity. It describes the amount of light that passes through, is emitted or reflected of a particular area.

In the present invention the luminance range consists of a minimum luminance-factor and a maximum luminance-factor; wherein the minimum luminance-factor and maximum luminance-factor may be equal to each other.

In a preferred embodiment, a plurality of luminance ranges are selected that succeeds, preferably succeeds equidistant, each other for having an accurate skeleton (500) of the image-gamut (200).

A determination of luminance-factor of a color value in a ND-DIGS is well-known by a skilled person. For CIELAB as ND-DIGS the L*-value is a measure of lightness, thus luminance-factor, of a color value. Conversion models and/or mathematical functions between ND-DIGS are also known by said skilled person.

From a color value in a ND-DIGS also chrominance (chroma), hue and saturation can be calculated by conversion models and/or mathematical functions.
Balance Point of a Collection of N-Dimensional Points A balance point of a collection of N-dimensional points is a point that fulfills a predetermined condition based on said collection of N-dimensional points. The balance point of a data set is the point on a number line where the data distribution is balanced. For example a balance point may be a centroid of said collection of N-dimensional points; it may be an average of said collection of N-dimensional points ir it may be a weighted average of said collection of N-dimensional points.

Hereby, as example, several conditions for determining a balance point of a collection of m 3D-points ($p_1$, $p_2$, $p_3$, ... $p_m$) wherein $p_i$ has three coordinates $\{a_i, b_i, c_i\}$ with i=1 ... m:

$$p_{balance} = \{\text{average}(a_i); \text{average}(b_i); \text{average}(c_i)\} \text{ with } i=1 \ldots m; \text{ or}$$

$$p_{balance} = \{(\Sigma q_a \times a_i + r_a)/m; \Sigma q_b \times b_i + r_b)/m; \Sigma q_c \times c_i + r_c)/m\}$$
with $i=1 \ldots m$ and $q_a; r_a; q_b; r_b; q_c$; and $r_c$ as weight factors Said collection of N-dimensional points forms a confined volume in an ND-space. From said confined volume; which is an ND-object; a centroid (as predetermined condition) may be determined; which may than be a balance point of said collection of N-dimensional points. A balance point does not necessary to be one of said N-dimensional points in the collection, but for the embodiment of color controlling for an output device in the present invention; a balance point is better one of said N-dimensional points in the collection. A balance point does not necessary to be part of said confined volume but it is in the present invention preferred to form a skeleton (5) of an oligochromatic pattern that corresponds better to each other.

Determination of a centroid of a confined volume or a collection of N-dimensional points is well-known in mathematics. It is sometimes called geometric center.

Manufacturing Decorative Panels

In the present invention the decorative panels are preferably wood-based decorative panels.

FIG. 1 illustrates prior-art scheme of manufacturing of decorative panels (1) in the following order
a) Step 100: on a paper substrate (50) an ink-receiving layer is applied by an ink-receiver applier (150); (=applying ink-receiving layer step)
b) Step 200: on said paper substrate an oligochromatic pattern is printed by a printhead (220) and cured by a drying device (230) for forming a decorative layer (250) (=inkjet printing and curing step)
c) Step 300: said decorative layer (250) is impregnated by a resin impregnator (320) and cut by a cutter (350) in a sheet of impregnated decorative layer (41) (=impregnation and cut step);
d) Step 400: on said sheet of impregnated decorative layer (41) a core layer (410) is applied (=applying core layer step);
e) Step 500: heatpressing said sheet of impregnated decorative layer (41) and core layer (410) in a heat press (550) for forming a decorative panel (650).

In the present invention, such as illustrated in FIG. 2 as preferred embodiment, in step 200 the decorative layer is measured by a color control unit (250) for calculating a color acceptance of a decorative panel (650) in front.

A wood-based laminate panel contains at least a core layer (410), a decorative layer and a protective layer and preferably contains also a balancing layer.

A decorative panel, like a floor panel, has a decorative layer on one side of the core layer (410) and preferably a balancing layer on the other side of the core layer (410). However, a decorative layer may be applied on both sides of the core layer. The latter is especially desirable in the case of laminate panels for furniture. In such a case, preferably also a protective layer is applied on both decorative layers present on both sides of the core layer.

The decorative panels are preferably selected from the group consisting of flooring panels, furniture panels, ceiling panels and wall panels, more preferably the decorative panels are flooring panels.

In order to protect the oligochromatic pattern of the decorative layer against wear, a protective layer is applied on top of the decorative layer. A balancing layer may be applied on the opposite side of the core layer (410) to restrict or prevent possible bending of the decorative panel. The assembly into a decorative panel of the balancing layer, the core layer (410), the decorative layer, and a protective layer is preferably performed in the same press treatment of preferably a DPL process (Direct Pressure Laminate).

In a preferred embodiment of decorative panels, tongue and groove profiles are milled into the side of individual decorative panels, which allow them to be slid into one another, preferably after applying glue to them. The tongue and grove join ensures, in the case of flooring panels, a sturdy floor construction and protects the floor, preventing dampness or water from penetrating.

REFERENCE SIGNS LIST

1 scheme of manufacturing decorative panels
5 skeleton
20 image-gamut
41 impregnated decorative layer as sheet
50 paper substrate
100 applying ink-receiving layer
150 ink-receiver applier
200 forming a decorative layer
220 print head
230 drying device
250 color control unit
300 impregnating a decorative layer
320 resin impregnator
350 sheet cutter
400 applying core layer to impregnated decorative layer
410 core layer
500 heat pressing
650 decorative panel
801 color gamut
802 color gamut
950 CIELAB

The invention claimed is:

1. A method of manufacturing decorative panels comprising:
    inkjet printing, by an inkjet printing system, an oligochromatic pattern on a substrate to form a decorative layer;
    impregnating, by a resin impregnator, the decorative layer with a thermosetting resin;
    heat pressing, by a heating press, the impregnated decorative layer together with a core layer to form a decorative panel; and
    identifying, by a color control unit, a color acceptance of the decorative panel after forming the decorative layer and before impregnating the decorative layer, wherein said identifying comprises:
        determining a first color value at a coordinate of the oligochromatic pattern;
        color measuring a second color value by using a color measuring device on a position of the decorative layer, wherein the position corresponds to said coordinate and the color measuring device is connected to said color control unit;
        converting with a color conversion model the second color value to a third color value, wherein the color conversion model is pre-determined after forming the decorative layer and before forming the decorative panel;
        comparing the first color value and the third color value to determine the color acceptance of the decorative panel by calculating a color difference of said first color value and said third color value and checking if said color difference is within a desired color difference range.

2. The method of claim 1, wherein the method further comprises:
   determining a dominant color value of the oligochromatic pattern before inkjet printing, wherein the first color value is said determined dominant color value.

3. The method of claim 2, wherein determining a dominant color value comprises:
   determining an image-gamut in an N-dimensional device independent color system of the oligochromatic pattern;
   thinning the image-gamut to a skeleton in said N-dimensional device independent color system;
   selecting a point on said skeleton as the dominant color value, wherein the point is substantially an inflection point, a cross point, or an end point.

4. The method of claim 2, wherein determining a dominant color value comprises:
   determining an image-gamut in an N-dimensional device independent color system of the oligochromatic pattern;
   clustering color values in the image-gamut into K clusters by K-means clustering;
   selecting a cluster of said K clusters; and
   selecting a point of the cluster as the dominant color value, wherein the point is substantially a centroid of the cluster or a point in the cluster with one or more of the substantially highest chroma and the substantially lowest luminance.

5. The method of claim 1, wherein the method further comprises:
   determining the first color value of the oligochromatic pattern before inkjet printing by:
      determining an image-gamut in a N-dimensional device independent color system of said oligochromatic pattern, wherein N>1 and said image-gamut comprises color values of said oligochromatic pattern; and
      determining a skeleton of said image-gamut, wherein the skeleton comprises a plurality of points, wherein the plurality of points are determined by:
         selecting a luminance-range for color values in said N-dimensional device independent color system;
         determining a sub-image-gamut of said image-gamut, wherein said sub-image-gamut corresponds to said luminance-range and comprises color values which have a luminance in said corresponding luminance range; and
         determining a color value in said sub-image-gamut as a point of said skeleton, wherein the first color value is a color value in said sub-image-gamut with a minimum color difference between said selected color value and said skeleton smaller than 3 $\Delta E_{CIELAB,94}$.

6. The method of claim 5, wherein said color value in said sub-image-gamut is a balance point of the sub-image-gamut, wherein said balance point is a point that fulfills a predetermined condition based on the collection of N-dimensional points of said sub-image-gamut.

7. The method of claim 6, wherein the balance point is substantially a centroid of the sub-image-gamut.

8. The method of claim 6, wherein the selected color value is one or more of an end point, an inflection point, and a cross point of said skeleton.

9. The method of claim 1, wherein the second color value is measured by a spectrophotometer, a line camera system, or a spectral linescan camera system.

10. The method of claim 9, wherein said inkjet printing system comprises an info generator and the method comprises generating the identified color acceptance for viewing by an operator of the inkjet printing system.

11. The method of claim 9, further comprising marking the substrate when the color acceptance is out the desired range for the color acceptance.

12. The method of claim 9, wherein the inkjet printing system comprises:
   a set of printheads for printing the oligochromatic pattern with a set of color channels; and
   a control system; and
   the method further comprises one or more of:
      adapting a minimum luminance jettable by said set of printheads according the desired range for the color acceptance; and
      adapting one or more of brightness and luminance of a color channel of said set of color channels according to the desired range for the color acceptance.

13. The method of claim 9, wherein the substrate has a porosity according to Gurley's method (DIN 53120) of between 8 and 25 seconds.

14. The method of claim 13, wherein the substrate has a paper weight between 50 and 170 g/m².

15. The method of claim 14, wherein the substrate is a paper substrate having on one or more ink-receiving layers.

* * * * *